United States Patent
Horiutchi et al.

Patent Number: 5,647,790
Date of Patent: Jul. 15, 1997

[54] METHOD FOR GENERATING TOOTH SURFACES OF GLOBOID WORM WHEEL

[75] Inventors: Akiyo Horiutchi, Obu; Shinya Saitoh, Toyo, both of Japan

[73] Assignee: Sumitomo Heavy Industries, LTD., Tokyo, Japan

[21] Appl. No.: 534,387

[22] Filed: Sep. 27, 1995

[30] Foreign Application Priority Data

Dec. 22, 1994 [JP] Japan .................. 6-319713

[51] Int. Cl.$^6$ .................................................. B24B 7/19
[52] U.S. Cl. .................. 451/47; 451/541; 451/547
[58] Field of Search ...................... 451/47, 541, 547, 451/51, 147, 161, 219, 275

[56] References Cited

U.S. PATENT DOCUMENTS

| | | | |
|---|---|---|---|
| 3,462,887 | 8/1969 | Hackman | 451/541 |
| 3,711,910 | 1/1973 | Strejc | 29/105 |
| 3,806,956 | 4/1974 | Supkis et al. | 451/59 |
| 3,875,635 | 4/1975 | Pavlov et al. | 451/47 |
| 4,114,322 | 9/1978 | Greenspan | 451/541 |
| 4,677,962 | 7/1987 | Loos et al. | 451/547 |
| 4,931,069 | 6/1990 | Wiand | 451/541 |
| 5,063,714 | 11/1991 | Meyer | 451/541 |
| 5,178,497 | 1/1993 | Kitabayashi et al. | 451/541 |

FOREIGN PATENT DOCUMENTS 53-139298  12/1978  Japan .

*Primary Examiner*—Willis Little
*Assistant Examiner*—Eileen P. Morgan
*Attorney, Agent, or Firm*—Nikaido, Marmelstein, Murray & Oram LLP

[57] ABSTRACT

There is disclosed a method for generating highly-accurate tooth surfaces of a globoid worm wheel without using a globoid worm hob. When generating tooth surfaces of a copper-alloy globoid worm wheel by grinding with an electro-deposition grinding tool including a cutting surface on which abrasive grains are embedded, the electro-deposition cutting tool then being finished to have the same tooth surfaces as a globoid worm which can engage with the globoid worm wheel, the generation of the tooth surfaces of the globoid worm wheel is carried out under such a condition that a maximum cutting depth of one abrasive grain is predetermined to be not more than a quarter of the average diameter of the abrasive grains.

3 Claims, 4 Drawing Sheets

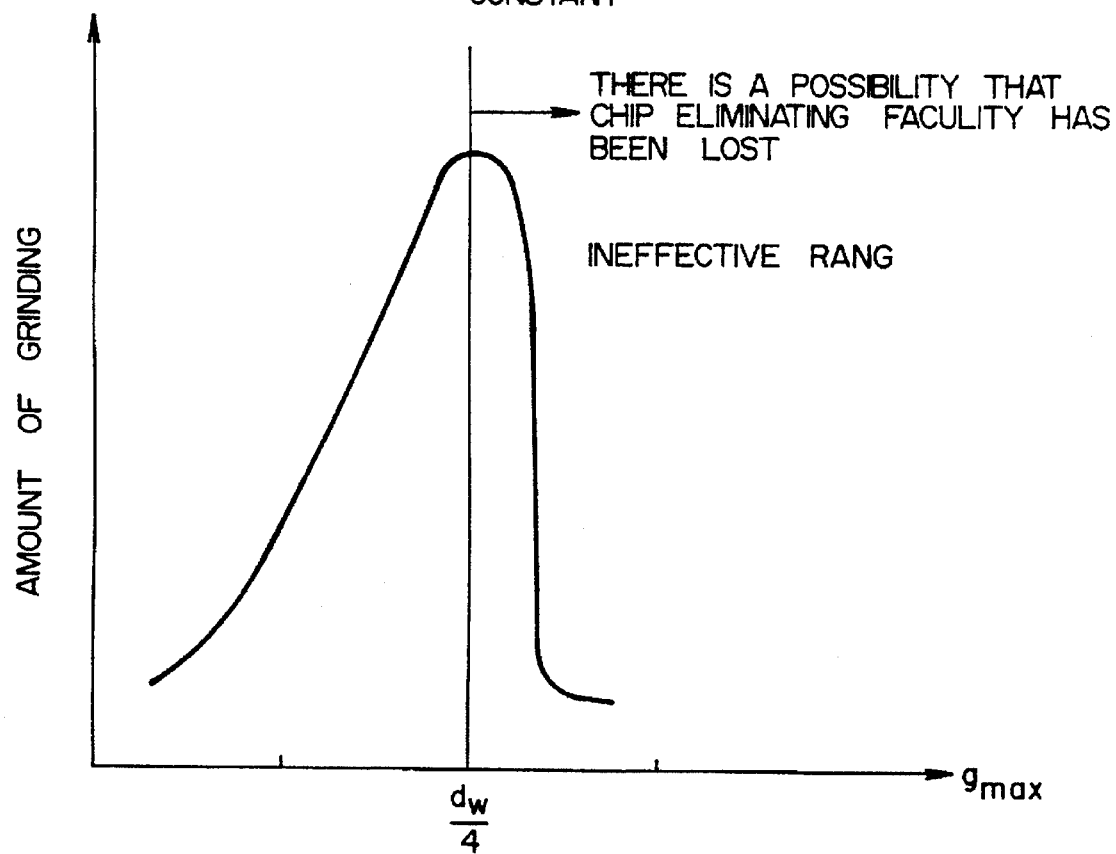

5,647,790

METHOD FOR GENERATING TOOTH SURFACES OF GLOBOID WORM WHEEL

BACKGROUND OF THE INVENTION

The present invention relates to a method for generating tooth surfaces of a globoid worm wheel.

Gear cutting of a globoid worm wheel has been conventionally carried out by means of a globoid worm hob (see FIG. 1) or a fly cutting tool which includes a portion of the globoid worm hob. The globoid worm hob includes a thread face whose lead is not constant, in contrast with a cylindrical worm hob. Relieving of a side face extending from a cutting edge of the globoid worm hob has to be performed substantially by manual operation, so that the tooth surfaces of the hob cannot be finished accurately. Also, when a rake face of the hob is re-ground, the tooth profiles of the hob deviates from ideal tooth profiles.

As described above, in the globoid worm hob which has been conventionally employed in a gear-cutting method for the globoid worm wheel, it is substantially difficult to perform the relieving of the side face extending from the cutting edge of the hob so that the globoid worm hob itself cannot be manufactured easily. As a matter of course, it is also difficult to generate highly-accurate tooth surfaces of a globoid worm wheel by using the globoid worm hob.

SUMMARY OF THE INVENTION

In view of the above-described problems of the prior art, an object of the present invention resides in providing a method for generating highly-accurate tooth surfaces of a globoid worm wheel without using a globoid worm hob.

According to one aspect of the invention, when generating tooth surfaces of a copper-alloy globoid worm wheel by grinding with an electro-deposition grinding tool having the same tooth surfaces as a globoid worm which can engage with the globoid worm wheel, and including a cutting surface on which abrasive grains are electro-deposited, the generation of the tooth surfaces of the globoid worm wheel is carried out under such a condition that a maximum cutting depth of one abrasive grain is predetermined to be not more than a quarter of the average diameter of the abrasive grains.

Alternatively, when generating tooth surfaces of a copper-alloy globoid worm wheel by grinding with a grinding tool including a cutting surface on which abrasive grains have previously been electro-deposited, the electro-deposition grinding tool being then finished to have the same tooth surfaces as a globoid worm which can engage with the globoid worm wheel, the generation of the tooth surfaces of the globoid worm wheel is carried out under such a condition that a maximum cutting depth of one abrasive grain is predetermined to be not more than a quarter of the average diameter of the abrasive grains.

In particular, the tooth surfaces of the globoid worm wheel are generated by grinding with the electro-deposition grinding tool including the cutting surface on which diamond abrasive grains or CBN abrasive grains are embedded.

BRIEF DESCRIPTION OF THE DRAWINGS

FIG. 5 is a graph showing a relationship between a maximum cutting depth $q_{max}$ of an abrasive grain and an amount of grinding.

DETAILED DESCRIPTION OF THE INVENTION

One preferred embodiment of the invention will now be described with reference to the accompanying drawings.

Figure 1:
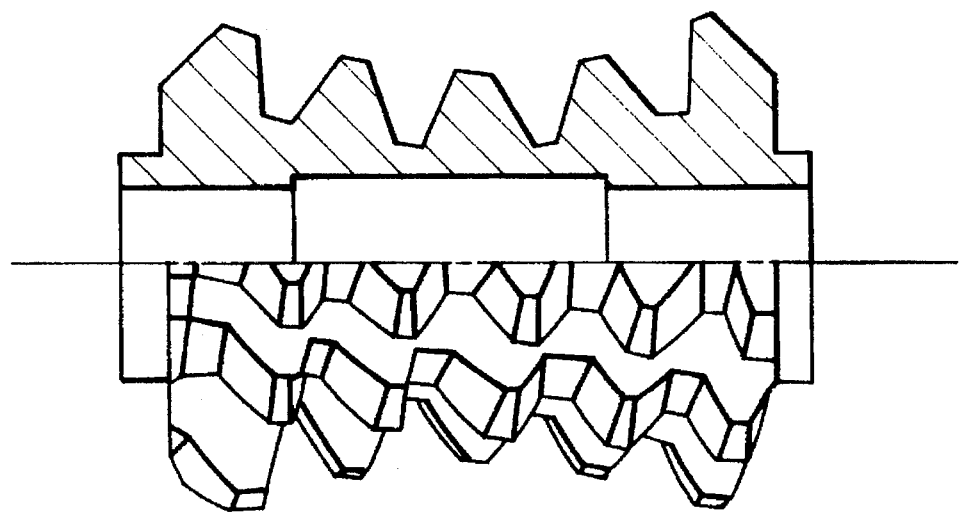
FIG 1 is a partially sectional side view of a conventional globoid worm hob.
Figure 2:
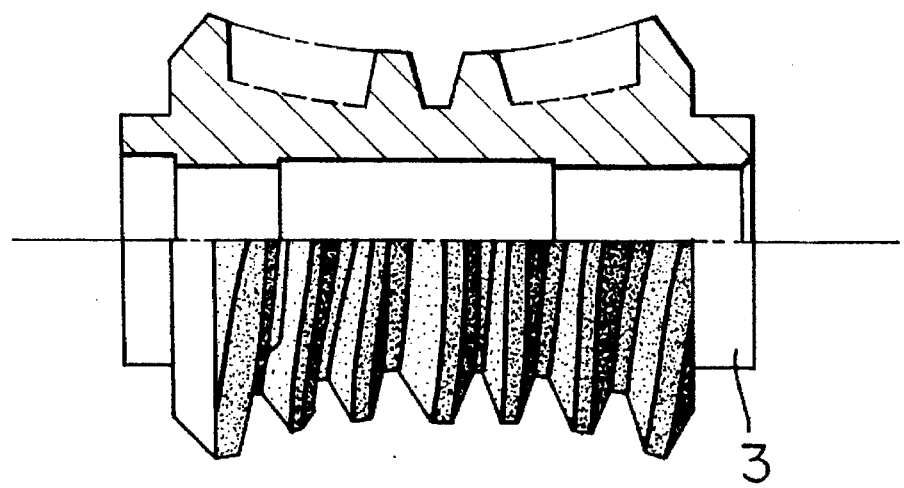
FIG. 2 is a partially sectional side view of an electro-deposition grinding wheel according to the present invention.

FIG. 2 shows an electro-deposition grinding tool 3 employed in the invention. The electro-deposition grinding tool 3 for generating tooth surfaces of a copper-alloy globoid worm, has the same tooth surfaces as those of a globoid worm gear which can engage the globoid worm wheel, the grinding tool including a cutting surface on which abrasive grains are electro-deposited. Alternatively, abrasive grains have previously been electro-deposited on a cutting surface of a grinding tool 3, and the electro-deposition grinding tool 3 is then finished to have the same tooth surfaces as those of a globoid worm which can engage a globoid worm wheel to be manufactured. Diamond abrasive grains or CBN abrasive grains are desirable as the abrasive grains.

The globoid worm wheel having tooth surfaces to be generated, is characterized in that the teeth thereof are made of copper alloy (for example, aluminum bronze). The tooth surfaces of the worm wheel are generated by grinding with the diamond electro-deposited grinding tool (or CBN grinding tool) which has been manufactured to have the same tooth surfaces as those of the globoid worm which can engage the worm wheel. A practical method for processing the worm wheel will be described hereinafter.

Figure 3:
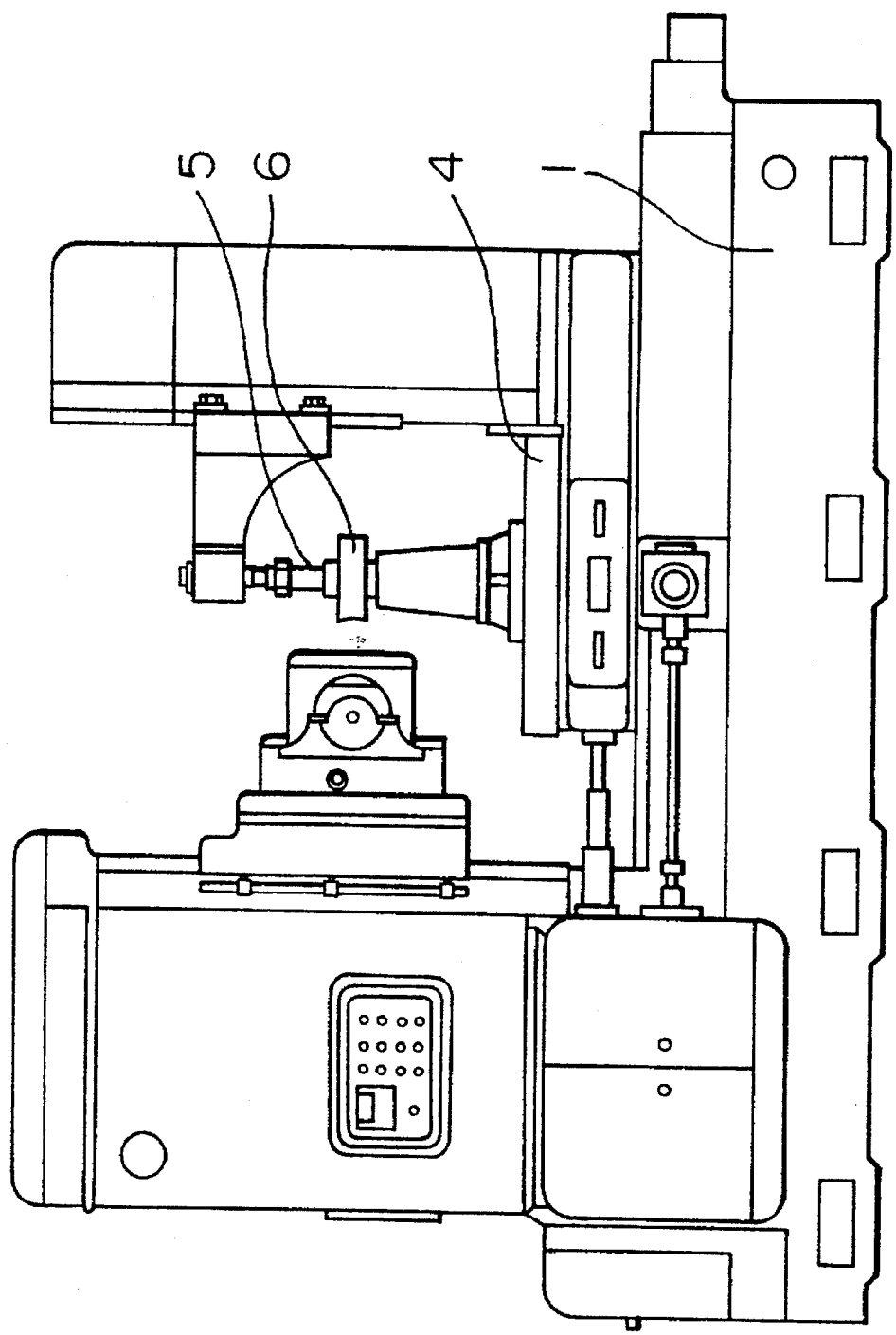
FIG. 3 is a front view of a gear hobbing machine on which the electro-deposition grinding tool of the invention is mounted, for explanation of a method for processing a work.
Figure 4:
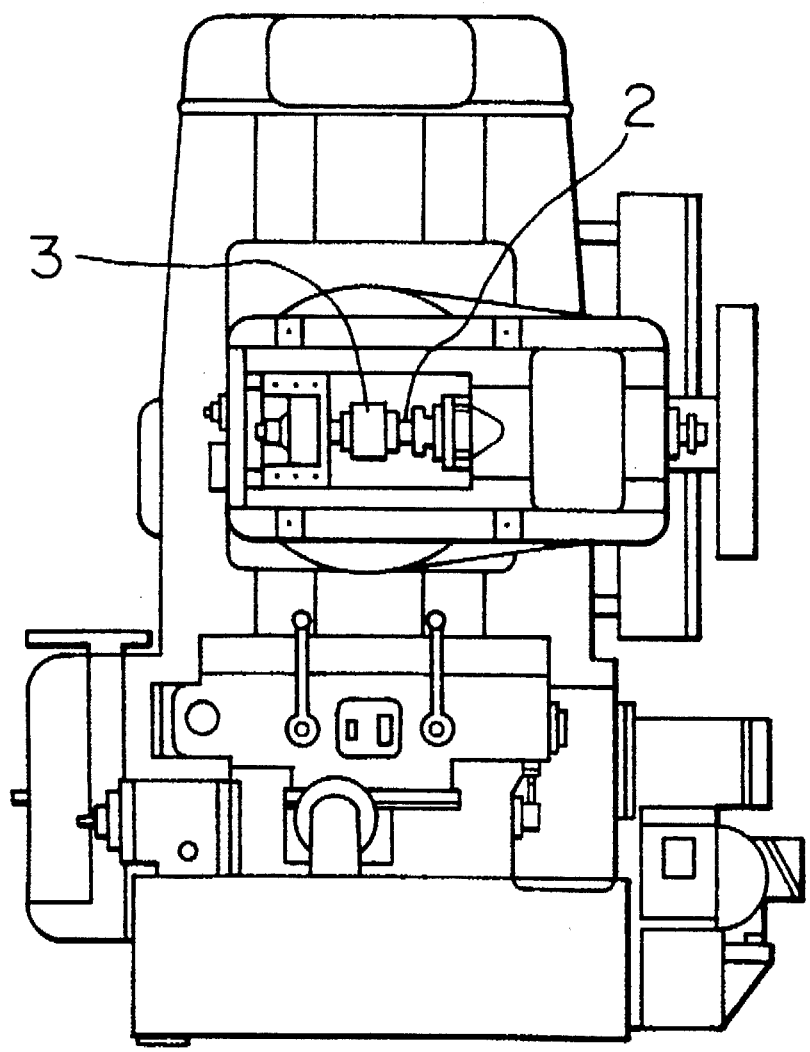
FIG. 4 is a side elevation of the gear hobbing machine on which the electro-deposition grinding tool of the invention is mounted, for explanation of the method for processing a work.

In the processing method of the globoid worm wheel, the grinding tool and a worm wheel material are dealt with in a similar way to a conventional hobbing method. More specifically, on a gear hobbing machine 1 as shown in FIGS. 3 and 4, the electro-deposition grinding tool 3 is attached to a hob arbor 2 in place of a hob, the hob being commonly attached to the hob arbor. The worm wheel material 6 is attached to a work spindle 5 on a table 4 of the hobbing machine.

In this state, while the hob arbor (grinding tool spindle) 2 and the work spindle 5 are rotated in a ratio of numbers of revolutions equivalent to a reduction gear ratio i between the worm and the worm wheel, the table 4 is moved toward the hob arbor (grinding tool spindle) 2. Then, the electro-deposition grinding tool 3 starts to generate the tooth surfaces of the worm wheel. When the grinding tool 3 has been thrust into the worm wheel material by a tooth depth of the worm wheel, the generation of the tooth surfaces of the globoid worm wheel has been completed.

In the case of the electro-deposition grinding tool, the abrasive grains are embedded in the electro-deposition layer by about half of the diameter of the abrasive grain, and the electro-deposition layer has no space convenient for eliminating chips resulting from the grinding of the worm wheel. In this connection, a grinding test was carried out for the purpose of finding out a condition under which a chip eliminating faculty of the grinding tool is not lost. FIG. 5 shows a result of the grinding test. In FIG. 5, the abscissa indicates a maximum cutting depth $g_{max}$ of one abrasive grain and the ordinate indicates an amount of grinding. As understood from the result of the grinding test, in a range where the maximum cutting depth $g_{max}$ is not more than dw/4 (dw: average diameter of the abrasive grains), the amount of grinding increases in accordance with an increase of the maximum cutting depth $g_{max}$. However, after the maximum cutting depth $g_{max}$ exceeds dw/4, even if it increases more, the grinding amount does not increase. On the contrary, the grinding amount drastically decreases.

That is to say, in a range of $g_{max}>$dw/4, there is a possibility that the chip eliminating faculty of the electro-deposition grinding tool has been lost, and the above range may be regarded as an ineffective range for the grinding. In view of the above, it is understood that when generating the tooth surfaces of the globoid worm wheel by grinding with the electro-deposition grinding tool, it is necessary to generate and finish the globoid worm wheel tooth surfaces under such a condition that the maximum cutting depth of one abrasive grain is predetermined to be not more than a quarter of the average diameter of the abrasive grains ($g_{max} \leq$dw/4). When such condition is satisfied, the electro-deposition layer of the grinding tool is formed with gaps having a depth of at least w/4 between the grinding tool and the surface of the work, so that the chip eliminating faculty of the grinding tool can be ensured.

As mentioned above, since the electro-deposition grinding tool does not necessitate both the cutting edge relieving process and the rake face regrinding process which are inevitably required for manufacturing the hob, when the tooth surfaces of the globoid worm wheel are generated and finished by such electro-deposition grinding tool, it is possible to manufacture the globoid worm wheel having the preferable finished tooth surfaces.

What is claimed is:

1. A method for generating tooth surfaces of a globoid worm wheel, comprising: generating tooth surfaces of a copper-alloy globoid worm wheel by grinding a globoid worm wheel blank with an electro-deposition grinding tool initially having the same tooth surfaces as a globoid worm which can engage with the globoid worm wheel, said grinding tool having a cutting surface on which abrasive grains are electrodeposited, said grinding including predetermining a maximum cutting depth of one abrasive grain to be not more than a quarter of an average diameter of the abrasive grains whereby subsequent machining is avoided.

2. A method for generating tooth surfaces of a globoid worm wheel, comprising: generating tooth surfaces of a copper-alloy globoid worm wheel by grinding a globoid worm wheel blank with a grinding tool including a cutting surface on which abrasive grains have previously been electro-deposited, said cutting surface including said abrasive grains having the same tooth surfaces as a globoid worm which can engage with said globoid worm wheel, said grinding including predetermining a maximum cutting depth of one abrasive grain to be not more than a quarter of an average diameter of the abrasive grains whereby subsequent machining is avoided.

3. A method for generating tooth surfaces of a globoid worm wheel according to claim 1 or 2, wherein said abrasive grains are diamond abrasive grains or CBN abrasive grains.

* * * * *